(12) United States Patent
Nemecek et al.

(10) Patent No.: US 8,533,537 B2
(45) Date of Patent: Sep. 10, 2013

(54) TECHNOLOGY INFRASTRUCTURE FAILURE PROBABILITY PREDICTOR

(75) Inventors: Rachel Nemecek, Charlotte, NC (US); John Cowan, Jr., Charlotte, NC (US); Edward M. Dunlap, Jr., Cramerton, NC (US); Eric Hunsaker, Charlotte, NC (US); Charles C. Howie, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 646 days.

(21) Appl. No.: 12/779,663

(22) Filed: May 13, 2010

(65) Prior Publication Data

US 2011/0283146 A1 Nov. 17, 2011

(51) Int. Cl.
*G06F 11/00* (2006.01)
*G06F 11/34* (2006.01)

(52) U.S. Cl.
USPC ........... 714/47.3; 705/7.28; 714/47.1; 714/49

(58) Field of Classification Search
USPC ......................... 705/7.28; 714/47.1, 47.3, 49
See application file for complete search history.

(56) References Cited

U.S. PATENT DOCUMENTS

| | | | |
|---|---|---|---|
| 6,536,037 B1 | 3/2003 | Guheen et al. | |
| 7,225,250 B1 | 5/2007 | Harrop | |
| 7,325,055 B2 | 1/2008 | Fukunari et al. | |
| 7,539,907 B1* | 5/2009 | Johnsen et al. | 714/47.2 |
| 7,684,792 B2 | 3/2010 | Lundblade et al. | |
| 7,822,894 B2* | 10/2010 | Harima et al. | 710/104 |
| 2002/0188582 A1 | 12/2002 | Jannarone et al. | |
| 2003/0088810 A1* | 5/2003 | Marshall | 714/38 |
| 2003/0115511 A1 | 6/2003 | Kubota | |
| 2004/0107125 A1 | 6/2004 | Guheen et al. | |
| 2004/0221176 A1* | 11/2004 | Cole | 713/201 |
| 2005/0114829 A1* | 5/2005 | Robin et al. | 717/101 |
| 2006/0058980 A1 | 3/2006 | Azpitarte | |
| 2007/0011113 A1* | 1/2007 | Mosleh et al. | 706/14 |
| 2007/0073724 A1 | 3/2007 | Walsh | |
| 2007/0168734 A1 | 7/2007 | Vasile | |
| 2007/0203719 A1 | 8/2007 | Kenagy et al. | |
| 2008/0140514 A1* | 6/2008 | Stenger | 705/10 |
| 2008/0140658 A1 | 6/2008 | Cox et al. | |
| 2008/0195407 A1 | 8/2008 | Hurley et al. | |
| 2008/0270213 A1* | 10/2008 | Christodoulou et al. | 705/8 |
| 2009/0125891 A1 | 5/2009 | Garimella et al. | |
| 2009/0138306 A1* | 5/2009 | Coburn et al. | 705/7 |
| 2010/0088538 A1* | 4/2010 | Kolbet et al. | 714/1 |
| 2010/0114634 A1* | 5/2010 | Christiansen et al. | 705/7 |
| 2010/0179819 A1* | 7/2010 | Herbst et al. | 705/2 |
| 2010/0250307 A1* | 9/2010 | Hollas | 705/7 |
| 2011/0067005 A1 | 3/2011 | Bassin et al. | |

OTHER PUBLICATIONS

International Search Report for International Application PCT/US11/34450, Jul. 3, 2011.
International Search Report for International Application PCT/US11/34437, Jun. 21, 2011.
International Search Report for International Application PCT/US11/34442, Jun. 29, 2011.
Henson, Short-term Associative Memories, Master's Thesis, MSc IT:IKBS Project Report, Department of Artificial Intelligence, University of Edinburgh, Sep. 1993, pp. 1-150, Edinburgh EH1 2QL, United Kingdom.

\* cited by examiner

*Primary Examiner* — Joseph Schell
(74) *Attorney, Agent, or Firm* — Weiss & Arons LLP; Michael Springs

(57) ABSTRACT

Apparatus and methods for reducing infrastructure failure rates. The apparatus and methods may involve reduction of data complexity. The reduction may be based on the use of nonlinear analysis to derive representative variables, which may be multi-valued. Multi-valued variables may be consolidated. A model may be developed based on the values and relationships of the derived variables. The model may be applied to assess the risk involved in a prospective infrastructure change.

14 Claims, 10 Drawing Sheets

| FIELD | CHANGE INDENTIFIER | CHANGE NAME | LIVE DATE | DESCRIPTION | HISTORICAL OUTCOME | CHANGE ELEMENTS, ORDER 1 | CHANGE ELEMENTS, ORDER 2 | CHANGE ELEMENTS, ORDER 3 | CHANGE ELEMENTS, ORDER 4 | CHANGE ELEMENTS, ORDER 5 | APPROVING TEAM |
|---|---|---|---|---|---|---|---|---|---|---|---|
| ILLUSTRATIVE VALUE | 345987 | ROUTER UPGRADE | MAY, 1 2010 | REPLACE ROUTERS WITH ACCESSION DATES ON OR BEFORE DECEMBER 31, 2007 | FAIL | PRINTERS (E10) | SCAN/FAX APPLICATIONS (E11) | ANALYTICAL APPLICATIONS (E6) | WORKSTATIONS (E7) | PRINTERS (E8) | X |
| | | | | | | WORKSTATIONS (E2) | DATA SERVERS (E5) | WEB SERVERS (E4) | | DATA SERVERS (E9) | Y |
| | | | | | | IMPLEMENTING TEAMS (E1) | CUSTOMER RELATIONS MANAGEMENT APPLICATIONS (E12) | | | | |
| | | | | | | APPROVING TEAMS (E12) | | | | | |

FIG. 2

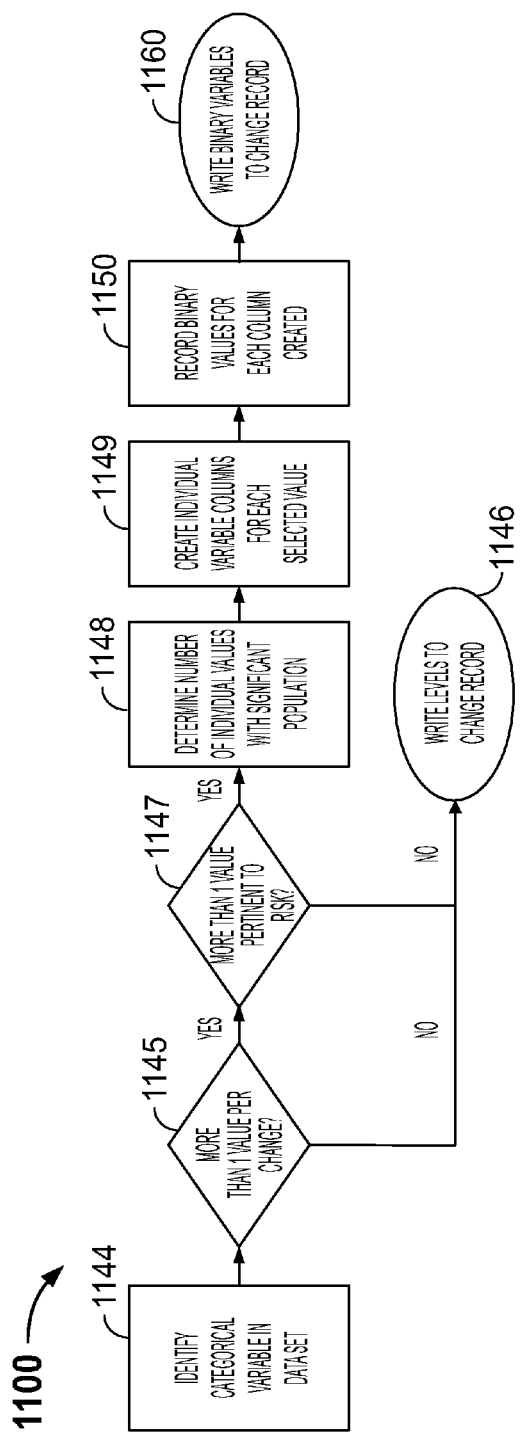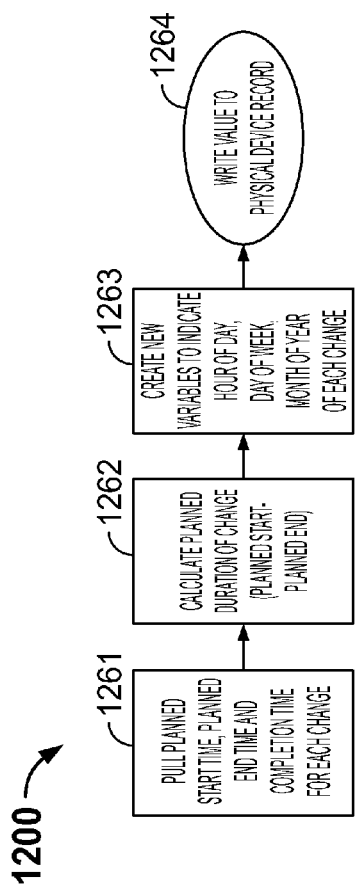

TECHNOLOGY INFRASTRUCTURE FAILURE PROBABILITY PREDICTOR

FIELD OF TECHNOLOGY

Aspects of the disclosure relate to predictive modeling. In particular, the disclosure relates to predicting the probability of failure of a technology infrastructure change.

BACKGROUND

Technology executives need tools to enable objective, informed decision-making related to infrastructure change deployment. The ability to predict technology failure risk ensures that appropriate changes are made at appropriate times for maximum production stability.

Conventional assessment of risk related to infrastructure change focuses on data surrounding the infrastructure change itself rather than on historical relationships such as those between physical devices, applications and individuals involved in the infrastructure change. As a result, there is a need for risk prediction that is related to those relationships.

It would be desirable, therefore, to provide apparatus and methods to reduce infrastructure failure rates.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows illustrative information in accordance with the principles of the invention;

FIG. 11 shows yet another illustrative process in accordance with the principles of the invention;

FIG. 12 shows yet another illustrative process in accordance with the principles of the invention;

DETAILED DESCRIPTION OF THE INVENTION

Figure 1:
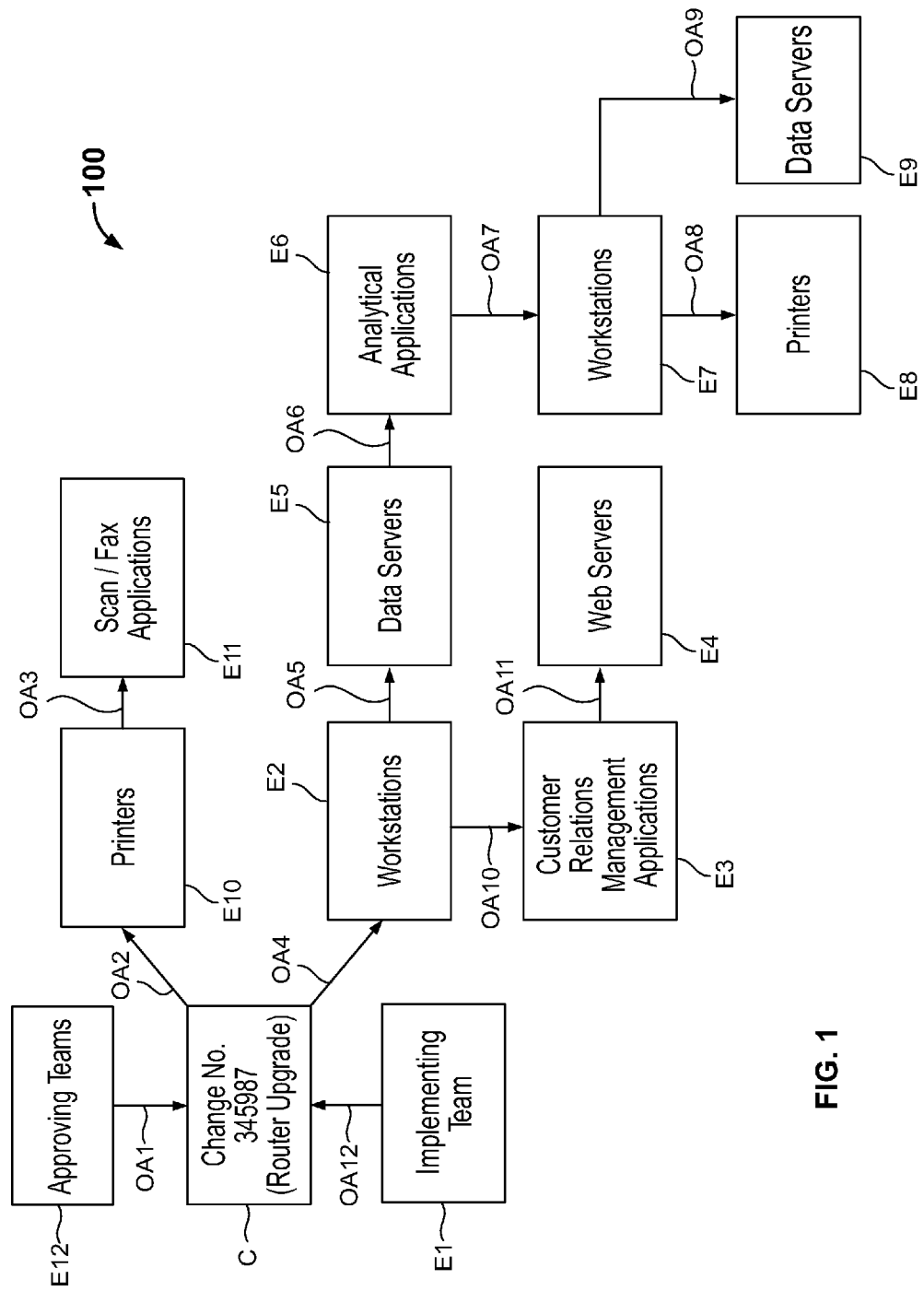
FIG. 1 shows an illustrative event that may be analyzed in accordance with the principles of the invention.

Apparatus and methods for reducing infrastructure failure rates are provided. Infrastructure may include hardware, software, apparatus, processes, information, applications, programs, circuits, schedules, financial instruments, transactional systems, manufacturing equipment, construction equipment, structures, roadways, transportation systems or any other types of infrastructure.

The apparatus may include machine readable memory that is configured to store a data object. The data object may include an infrastructure change identifier, corresponding to an infrastructure change, a device identifier that identifies a device that is associated with the change, and an application identifier that identifies a program that is associated with the change.

The infrastructure change may be an addition, a new or revised deployment, replacement, repair, construction, routing, scheduling or any other suitable change.

The apparatus may include a processor. The processor may be configured to provide an index that is based on the infrastructure change identifier, the device identifier and the application identifier. The index may correspond to a predicted failure rate for the infrastructure change.

The index may be an output of a predictive model. In some embodiments, the predictive model may determine a probability of failure of the infrastructure change. The model may be based on historical information about the failures of past infrastructural changes. In some embodiments, the failure risk of a prospective infrastructure change may be predicted based on performance (success or failure) of historical infrastructure changes that have similar characteristics.

The predictive model may include independent variables that are based on infrastructure changes. The independent variables may be organized as fields of change records that are related to the infrastructure changes. The predictive model may be developed using algorithms that predict the value of a success/fail score, which may be a dependent variable. The predictive models may be trained using historical values of the success/fail score. A predictive model that "predicts" historical success/fail scores with sufficient accuracy may be deployed to predict the value of a success/fail score for a prospective change that is represented by a change record. A failure prediction for a prospective infrastructure failure may be used to take action to avoid or reduce the likelihood of failure.

The infrastructure may support activities of an enterprise. The enterprise may be a commercial enterprise, a personal enterprise, a non-profit entity, a governmental enterprise or any other suitable enterprise.

The enterprise may provide one or more products or services ("the goods") to a customer or engage in activities associated with the customer. For example, the enterprise may provide financial services, consumer products, durable goods, construction services, shipping, transportation, social services or any other suitable goods or services.

The customer may be a business, a governmental body, a member of the public, a group, an individual or any other suitable customer.

A failure may be an event or pattern of events (the "event") that are indicative that an enterprise infrastructure performed at a level below a desired level. For example, when the enterprise provides goods to a customer, the customer may experience the goods as having less quality than a threshold quality level. The quality level may be based on quality, quantity, availability, timing, customer service or any other suitable metric. The threshold quality level may be set by the enterprise. The threshold quality level may be set by the customer. The event may be judged a failure by the enterprise. The event may be judged a failure by the customer.

The probability of failure may be constructed as a percent likelihood that the infrastructure change will fail on or after deployment. The model may determine the risk percentile of an infrastructure change. For example, the predictive model may describe where the change would fall in the overall risk distribution of historical change for the enterprise.

In some embodiments, the model may also produce one or more factor correlations for the infrastructure change. If the infrastructure change is a failure, the model may identify factors that correlate positively with the failure. For example, when an infrastructure change crosses lines of business and involves hardware that is updated infrequently, the crossing of lines of business and the infrequently updated hardware may both be correlated factors. The correlation factors may help the enterprise make informed decisions regarding implementing infrastructure changes.

The data object may correspond to a change record. The change record may be an information structure that identifies the infrastructure change. The change record may include fields. The change record may include one or more change fields that correspond to the nature and scope of the change. For example, the change fields may include a change identifier, a change date, a proposed change date, a change description (e.g., upgrade router), a change scope (all routers purchased before 1998) and other suitable change fields. The change record may include data structures that are distributed across different devices. The change record may include data structures that are distributed across different processes.

In some embodiments, the change record may correspond to an observation or row in a data analysis workbench data set. The change fields may correspond to columns or "variables" in the data set.

The change record may include the success/fail score. The success/fail score may be continuously, discretely, categorically or binary valued variable. The change record may be one of a "universe" of change records that relate to historical changes in the enterprise infrastructure. The universe may be used to determine historical relationships between change factors and failures. The historical relationships may be used to predict future failures of prospective changes based on the historical relationships.

The change record may include one or more change element fields. Each change element field may correspond to an infrastructural element that has an operational or organizational association ("an operational association") with the change. The operational association may be a physical association, a logical association, a virtual association, a causal association, an economic association, financial association or any other suitable association. For example, when an infrastructure change includes replacement of a router, change elements may include one or more upstream or downstream devices in communication with the router. The change elements may include applications on the devices. Each change element may be identified in a corresponding change element field in the change record. For example, each element may have a corresponding unique change element identifier.

Change element fields may include any suitable information based on a change element. For example, a change record may include one change element field that identifies a change element, such as a router, and a series of change element fields that correspond to attributes of the change element, like router driver, firmware, bandwidth, transmitter power and the like.

Change elements may include enterprise organizational segments. For example, an organization segment such as a project team may be a change element. The project team may be an approving organizational segment. The approving organizational segment may have responsibility for approving the infrastructural change, whether at proposal stage, performance stage or completion stage. In some embodiments, the data object may include an approver identifier.

The project team may be an implementing team. The implementing team may by a team that performs some or all of the change. The data object may include an identifier that identifies the implementing team.

The device may be a change element.

The program may be a change element.

The processor may be configured to incorporate the element identifiers into the change record. In some embodiments, the processor may be configured to generate one or more supplemental values based on a change element. A supplemental value may be a variable that is derived from one or more attributes of the change elements (a "derived variable"). For example, the supplemental value for a router may be a mean time between failures for the router.

The change record may also include one or more operational associations of the elements. In some embodiments, for example, an operational association may logically link a first change element to a second change element when a change in the first change element does or may cause a change in the likelihood of failure of the second change element. The change itself may be viewed as a change element that has an operational association with one or more other change elements. The change itself may affect downstream change elements, such as devices or programs that depend on the change. The change itself may be affected by upstream change elements, such as an implementing team or an approving team. The operational associations may be stored such that the processor can map the operational associations between the change elements.

The processor may be configured to calculate a failure rate by device, the failure rate determined by dividing the number of failed infrastructure changes associated with the device by the total number of infrastructure changes associated with the device.

Where the device and the program, among other elements, are elements of the change, if the change is a failure, the processor may be configured to identify one or more of the elements that are positively correlated with the failure.

The apparatus and methods may acquire data from multiple sources of infrastructure information. The infrastructure information may be consolidated in a centralized database.

The infrastructure information may include physical device data that may include attributes of the physical items that may affect or be affected by the change. Examples of physical device data include the type of configurable item (i.e. server, network, etc.), the type of and number of CPUs in the configurable item, the operating system, the manager of the item, and any other relevant data.

The infrastructure information may include application data that relates to includes providing information on all the applications supported by or housed on the physical devices impacted by the change. Examples of application data may include a peak number of users on each application, an average transaction volume of each system, whether the application is internally or externally facing, a number of downstream applications dependent on the impacted applications, code inspection and review procedures for an application and any other relevant application data.

The infrastructure information may include change data providing attributes of the change itself, such as a priority, a level of process rigor, turnaround time, planned duration, and any other relevant data.

The infrastructure information may include incident data, providing information on historical failures caused by the change, such as failure duration, timing, root cause, magnitude, and any other relevant data.

The infrastructure information may include data related to approving organization describing attributes of the organization impacted by the change. Such data may include an organization name, a rate of successful approvals, and any other relevant data.

The infrastructure information may also include data related to an implementing team describing attributes of the team. Such data may include the team name and hierarchy, an overall success rate regarding performance at performing the particular type of change, overall success rate at performing change on the implicated physical devices, and any other relevant data.

Derived variables may be based on any suitable logic or algorithm. For example, variables may be created by looking at behaviors across a time series to create a performance metric. Derived variables may be created by aggregating like "levels" of data based on functional or statistical similarity. (A level is an interval on a spectrum of data values. For example, for a continuous variable, a level may be a numerical range. For a categorical variable, a level may be a category. For an ordinal variable, a level may be an order. For cluster-based variables, the level may be a cluster parameter, statistic, identifier or the like.)

Derived variables may use a number of incoming pieces of data to derive a new piece of information.

When a change is operationally associated with a large number of change elements, a derived variable may be formulated and evaluated to represent the failure risk of the large number of change elements. In some instances, the large number of change elements may have in the aggregate a wide spectrum and large number of attribute values (levels). For example, a router change may be operationally associated with 1,000 receivers. The receivers may have mean time between failures that range from 3 months to 60 months. In terms of months, there may be 57 levels of mean time between failures.

Using the change record universe, the levels may be grouped into a smaller number of representative levels for computational or analytical simplicity. For example, the levels may be simplified using one or more tree models or clustering algorithms.

Indicator variables may be created for variables where multiple values are provided and, for functional reasons, one value cannot be selected. A binary variable may be created for each possible value of the data element and the presence of that value is indicated on each individual change. For example, a router change for a change record identified as Change No. 456789 may be operationally associated with 1,500 wireless communication devices. The change record universe may include 4,000 wireless communication devices. Among the 4,000 communication devices there may be groups of 1-, 2-, 3-, . . . , and N-channel devices (n=1 to N). Certain groups, corresponding to different values of n, may be identified as being important for failure prediction. Those groups may be selected. Derived binary variables for the selected groups may be added to the change record. For example, groups corresponding to n=2, 4, 6, 24 may be selected. Derived variables "2," "4," "6" and "24" may be added to change record 456789. The derived variables "2," "4," "6" and "24" would then be evaluated as "0" or "1" (or the equivalent) based on the inclusion or exclusion of 2-, 4-, 6- and 24-channel wireless communication devices among the 1,500 wireless communication devices in the change.

Changes recorded in the central database may be classified as a success or failure, based on one or more tests. The classification may be recorded and applied in the creation of the derived variables.

A derived variable may be created by calculating the failure rate by physical device. Accordingly, the variable may describe how often changes performed on a particular physical device have failed.

Another derived variable may be created by calculating failure rate by implementing team. Such a variable may describe how often changes performed by a particular implementing team have failed. Rates may be calculated based on each type of change performed.

Another derived variable may be created by collapsing values of distinct approving organizations using clustering. A set of approving organization data may be clustered and then correlated against failure rate to create a smaller set of failure rates by approving organization.

Another derived variable may be created by calculating the number of physical devices impacted by a change.

Another derived variable may be created by calculating the average changes per physical device over a defined time period.

Additional derived variables may be created based on date and time attributes of the change, such as the date, time, hour and month a change occurs.

For some of the derived variables, a 1:many relationship is created between an individual change and many related variable values. Values for each variable may be selected or collapsed based on a variety of methods, including calculation of greatest risk, summation, indicator variables, and consolidation logic. After all the 1:many relationships have been resolved, the data may be compiled into a viewable display that provides one line per change with the calculated values for each variable.

In the calculation of greatest risk method for collapsing variable values, each possible variable value can be evaluated against success or failure over time. In the case of categorical variables, the value which presents greatest risk can be determined. Each variable value can be tested individually against all change failure and its risk level can be determined. In the case of interval variables, the direction (i.e. higher or lower) which presents greatest risk can be determined using regression, or by some other suitable calculation. Of all the values associated with the change, the one with the greatest calculated risk can be selected and assigned.

In the summation method for collapsing variable values, certain types of interval variables can be matched and summed to produce a total for the change.

In the indicator variables method for collapsing variable values, unique binary variables may be created for each distinct value of the variable. The range of data encoded in the binary variables preferably preserves all the data from the multiple variable values, while allowing a 1:1 relationship between each variable and the change. For example, for a change potentially involving eight devices, the combination of devices involved may be significant. Eight binary variables may be created, each corresponding to a single device. In this way the relationship between change failure and the interactions between the devices is captured in the change record.

The consolidation logic method for collapsing variable values, preferably uses AND/OR logic to group values for a given variable. Under AND logic, all the specified values should preferably be present in order to create a change record classified as true. For example, if 250 different elements are all above a predetermined threshold value, the record is classified as true. If not, the record is classified as false.

Using OR logic to collapse the variable values, at least one of the specified values should be present to obtain a true classification. For example, if the change record incorporates 350 applications and two are known to cause failure, OR logic may be applied to test whether any variable values incorporate those two failed applications. If any of the specified values are present, the record is classified as true. When no specified values are present, it is classified as false.

After the variable values have been determined, the data may be imputed and transformed to render it more suitable for effective modeling. Missing values may be imputed using standard methods such as individual decision trees, means or constants, or any other suitable method, as applicable for each variable. Missing values for categorical variables may be replaced using levels specified by the modeler, or using any other suitable method. Interval variables presenting with a highly skewed distribution may be logarithmically transformed to minimize the effect of outliers or adjusted by any other suitable method.

Models may be created using regression, neural networks, and decision trees or any other suitable method. Models may be tested against historical data. Data mining software may be used to select the model with the greatest predictive capability, based on the optimization of a particular statistic, such as lift, average squared error or any other suitable statistic.

In applying the model prospectively, the variables may be mapped, derived, and collapsed as described above. The values may be entered into the model to calculate a percent failure rate for a proposed infrastructure change.

In some embodiments, the apparatus may include machine memory storing a first entity segment identifier, a second entity segment identifier, an infrastructure change identifier that identifies an historic infrastructure change, and a failure characteristic corresponding to the historic infrastructure change, each addressable as a different component of a data object. The data object may correspond to a change record or a portion of a change record.

The first entity segment identifier may correspond to an approving entity that includes one or more approving organizations associated with the infrastructure change.

The second entity segment identifier may correspond to an implementing team that is associated with the infrastructure change.

The apparatus may also include an input module that is configured to receive a prospective infrastructure change record.

The apparatus may also include a processor that is configured to provide an index based on the prospective infrastructure change record and the data object.

The approving entity and the implementing team may be parts of a group of elements, each with an organizational association with the infrastructure change. Each element may also have an element identifier. The processor may be configured to include any elements from this group in the data object. The data object may also include the organizational associations of the elements.

The processor may be configured to calculate a failure rate for an approving entity associated with a number of changes. The failure rate may be calculated by dividing the number of failed changes associated with the approving organization by the total number of changes associated with the approving organization.

Where there is a group of approving entities, each associated with a respective failure rate, the processor may be configured to identify two or more clusters of approving entities and correlate the clusters with the failure rates. The approving entities are clustered using a self organizing map.

The processor may be configured to calculate a failure rate for an implementing team associated with a number of changes. The failure rate may be calculated by dividing the number of failed changes associated with the implementing team by the total number of changes associated with the implementing team.

Where the approving entity and the implementing team, among other elements, are elements of the change, if the change is a failure, the processor may be configured to identify one or more of the elements that are positively correlated with the failure.

In some embodiments, the apparatus may include machine memory storing logical links. The links may associate an infrastructure change with one or more elements of the change.

In some of those embodiments, each of the elements may have a failure risk score. The apparatus may also include a processor that is configured to determine a representative risk score. The risk score corresponds to a sum of the failure risk scores of the elements.

Each of the elements may have an order n, n=1, 2, 3, . . . , based on logical proximity to the infrastructure change. The logical links may form logical chains that extend from the infrastructure change to the elements. Each link between elements may extend from a higher order element to a lower order element.

Each logical chain may have a chain risk score. The chain risk score may be based on the multiplicative product of the failure risk scores of the elements of the chain. The sum of the failure risk scores of the elements may include the sum of the chain risk scores.

One or more of the elements of the infrastructure change may be a device associated with the change. Other elements of the infrastructure change may be approving organizations associated with the change. Other elements of the infrastructure change may be an implementing team associated with the change.

The processor may be configured to provide an index that is based on the representative failure risk score. The index may correspond to a predicted failure rate for the infrastructure change.

Where the infrastructure change is classified as a failure, the processor may be configured to identify one or more of the elements that are associated with the change that are positively correlated with the failure.

In some embodiments, the apparatus may include machine memory storing an infrastructure change record. The change record may correspond to an infrastructure change that includes two or more change elements.

The apparatus may also include a processor that is configured to enter a result of a Boolean operation on one or more of the change elements into the change record.

A Boolean operation on change elements may be an intersection or a union between the change elements and an element characteristic. Examples such operations may include an intersection of the change elements and a device characteristic, an intersection of the elements and an organizational segment characteristic, and a union of the elements and a program characteristic.

The Boolean operation may be an intersection of a first element characteristic and a second element attribute. Examples of element characteristics may include device characteristics, program characteristics, and organizational segment characteristics.

In some embodiments, the apparatus may include machine memory that stores a first array of infrastructure change element attributes and a second array of change element tallies. Each tally may correspond to one of the change element attributes and include a number of change elements that have the attribute. The first and second arrays may be based on a plurality of historical change records. The apparatus and methods may include a processor that is configured to: (1) select one or more of the change element attributes based on the corresponding tallies; (2) select one of the plurality of historical change records; and (3) enter into the selected change record a Boolean indicator corresponding to each of the selected change element attributes.

In some embodiments, in the attributes in the first array may include device attributes. The device attribute may be a device model.

In some embodiments, the attributes in the first array may include program attributes. The program attribute may be a program version.

In some embodiments, the attributes in the first array may include organization segment attributes. The organization segment attribute may be a segment membership number.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Embodiments of the invention will now be described with reference to FIGS. 1-14.

FIG. 1 shows illustrative infrastructure change map 100. Change map 100 represents change C and change elements E1 (an implementing team), E2 (workstations), E3 (customer relations management applications, E4 (web servers), E5 data servers, E6 (analytic applications), E7 (workstations), E8 (printers), E9 (data servers), E10 (printers), E11 (scan/fax applications) and E12 (approving team).

Change C is illustrative of a change in the infrastructure of an enterprise. Change C is illustrated as a router upgrade and is identified for illustration as Change No. 345987 of a population of changes that is associated with the enterprise. Change elements Ei (i=1 to 12) are operationally associated with change C. The operational associations are identified as OA1-OA12. OA1-OA12 may indicate, for a pair of operationally associated change elements, which element affects the other.

Map 100 shows changes E1 and E12 as being "upstream" of change C. Map 100 shows changes E2-E11 as being "downstream" of change C. Map 100 illustrates work stations E2 as being a single element for the sake of illustration, but work stations E2 may include any suitable number of work stations that are operationally associated with change C as is E2.

FIG. 2 shows illustrative change record 200. Illustrative change record 200 may be one of a universe of change records that is associated with the enterprise. Change record 200 may correspond to change C (shown in FIG. 1). Change record 200 may include fields 202. Change record 200 may include values 204 that correspond to the fields. Value 206 is change identifier 345987. Value 208 is the change name "router upgrade." Value 210 is live date "May 1, 2010," which is the hypothetical date that change 345987 went live. Value 212 is a plain language description of change 345987. Value 214 is an historical outcome of change 345987, which was a failure.

Value 216 is an array of first order change elements. The first order change elements of change 345987 are E10, E2, E1 and E12 (shown in FIG. 1). Each of values 216 may include one or more arrays, which may be nested. The arrays may include change element attributes. For example, printers E10 may include an array of a plurality of printers. Each of the printers in the array may be identified by serial number.

Value 218 is an array of second order change elements. The second order change elements of change 345987 are E11, E5 and E3 (shown in FIG. 1). Each of values 218 may include one or more arrays, which may be nested. The arrays may include change element attributes. For example, printers scan/fax applications may include an array of applications that drive scan and fax functions of the respective printers. Each of the printers in the array may be identified by serial number.

Value 220 is an array of third order change elements. The third order change elements of change 345987 are E6 and E4 (shown in FIG. 1). Each of values 220 may include one or more arrays, which may be nested and include change element attributes.

Value 222 is an array of fourth order change elements. The fourth order change elements of change 345987 include E10 (shown in FIG. 1). Each of values 222 may include one or more arrays, which may be nested and include change element attributes.

Value 224 is an array of fifth order change elements. The fifth order change elements of change 345987 are E8 and E9 (shown in FIG. 1). Each of values 220 may include one or more arrays, which may be nested and include change element attributes.

Value 226 is an array of approving teams. The approving teams for change 345987 are Team X and Team Y.

Change record 200 may include any suitable number of change element orders.

Change record 200 may include fields for operational associations OA1-OA12 (shown in FIG. 1, not shown in FIG. 2).

Change record 200 may be one of a universe of change records that is used to determine historical relationships between factors and failure. In predictive modeling, the relationships may be applied to a change record for a prospective change. A prospective change record may have one or more of values 204. A prospective change record may not include historical outcome 214.

Figure 3:
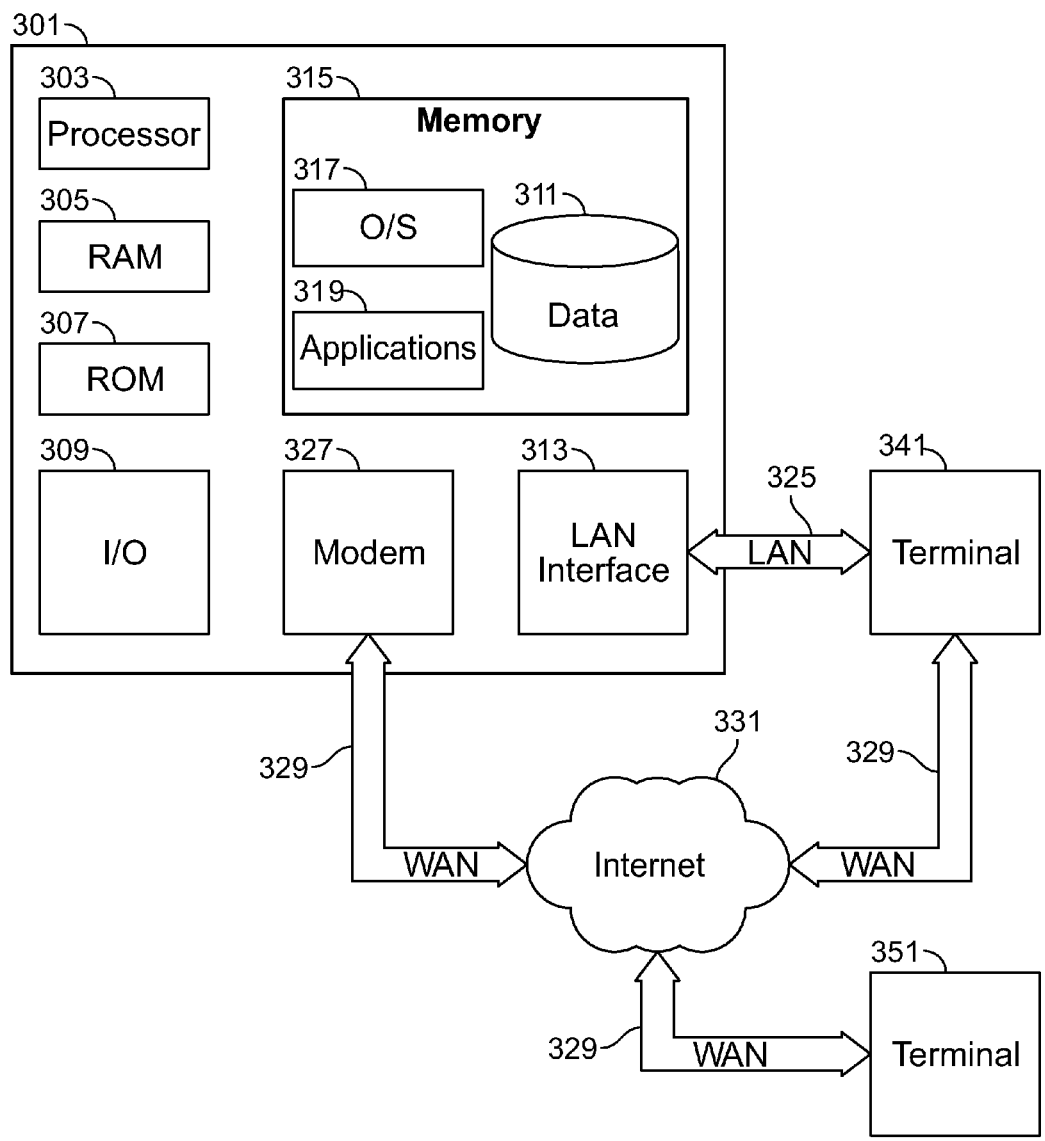
FIG. 3 shows illustrative apparatus in accordance with the principles of the invention.

FIG. 3 is a block diagram that illustrates a generic computing device 301 (alternatively referred to herein as a "server") that may be used according to an illustrative embodiment of the invention. The computer server 301 may have a processor 303 for controlling overall operation of the server and its associated components, including RAM 305, ROM 307, input/output module 309, and memory 315.

Input/output ("I/O") module 309 may include a microphone, keypad, touch screen, and/or stylus through which a user of device 301 may provide input, and may also include one or more of a speaker for providing audio output and a video display device for providing textual, audiovisual and/or graphical output. Software may be stored within memory 315 and/or storage to provide instructions to processor 303 for enabling server 301 to perform various functions. For example, memory 315 may store software used by server 301, such as an operating system 317, application programs 319, and an associated database 321. Alternatively, some or all of server 301 computer executable instructions may be embodied in hardware or firmware (not shown). As described in detail below, database 321 may provide storage for infrastructure change data, values of variables, mapping data, modeling results and any other suitable information.

Server 301 may operate in a networked environment supporting connections to one or more remote computers, such as terminals 341 and 351. Terminals 341 and 351 may be personal computers or servers that include many or all of the elements described above relative to server 301. The network connections depicted in FIG. 3 include a local area network (LAN) 325 and a wide area network (WAN) 329, but may also include other networks. When used in a LAN networking environment, computer 301 is connected to LAN 325 through a network interface or adapter 323. When used in a WAN networking environment, server 301 may include a modem 327 or other means for establishing communications over WAN 329, such as Internet 331. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 319, which may be used by server 301, may include computer executable instructions for invoking user functionality related to communication, such as email, short message service (SMS), and voice input and speech recognition applications.

Computing device 301 and/or terminals 341 or 351 may be mobile terminals including various other components, such as a battery, speaker, and antennas (not shown).

Terminal 351 and/or terminal 341 may be portable devices such as a laptop, cell phone, blackberry, or any other suitable device for storing, transmitting and/or transporting relevant information.

Infrastructure change data, values of variables, mapping data, modeling results and any other suitable information may be stored in memory 315.

One or more of applications 319 may include one or more algorithms that may be used to perform the calculation of variable values, collapsing multiple variable values, model development, calculation of percent likelihood of failure and any other suitable task related to assessing the risk associated with an infrastructure change.

The one or more algorithms may include those available in a data mining workbench such as that sold under the trademark SAS ENTERPRISE MINER by SAS Institute, Inc., Cary, N.C.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may be practiced in distributed computing environments where tasks are performed by remote processing devices that are linked through a communications network. In a distributed computing environment, program modules may be located in both local and remote computer storage media including memory storage devices.

Processes in accordance with the principles of the invention may include one or more features of the process illustrated in FIGS. 4-14. For the sake of illustration, the steps of the process illustrated in FIG. 4-14 will be described as being performed by a "system." The "system" may include one or more of the features of the apparatus that are shown in FIG. 1 and/or any other suitable device or approach. The "system" may be provided and or deployed by an entity.

Figure 4:
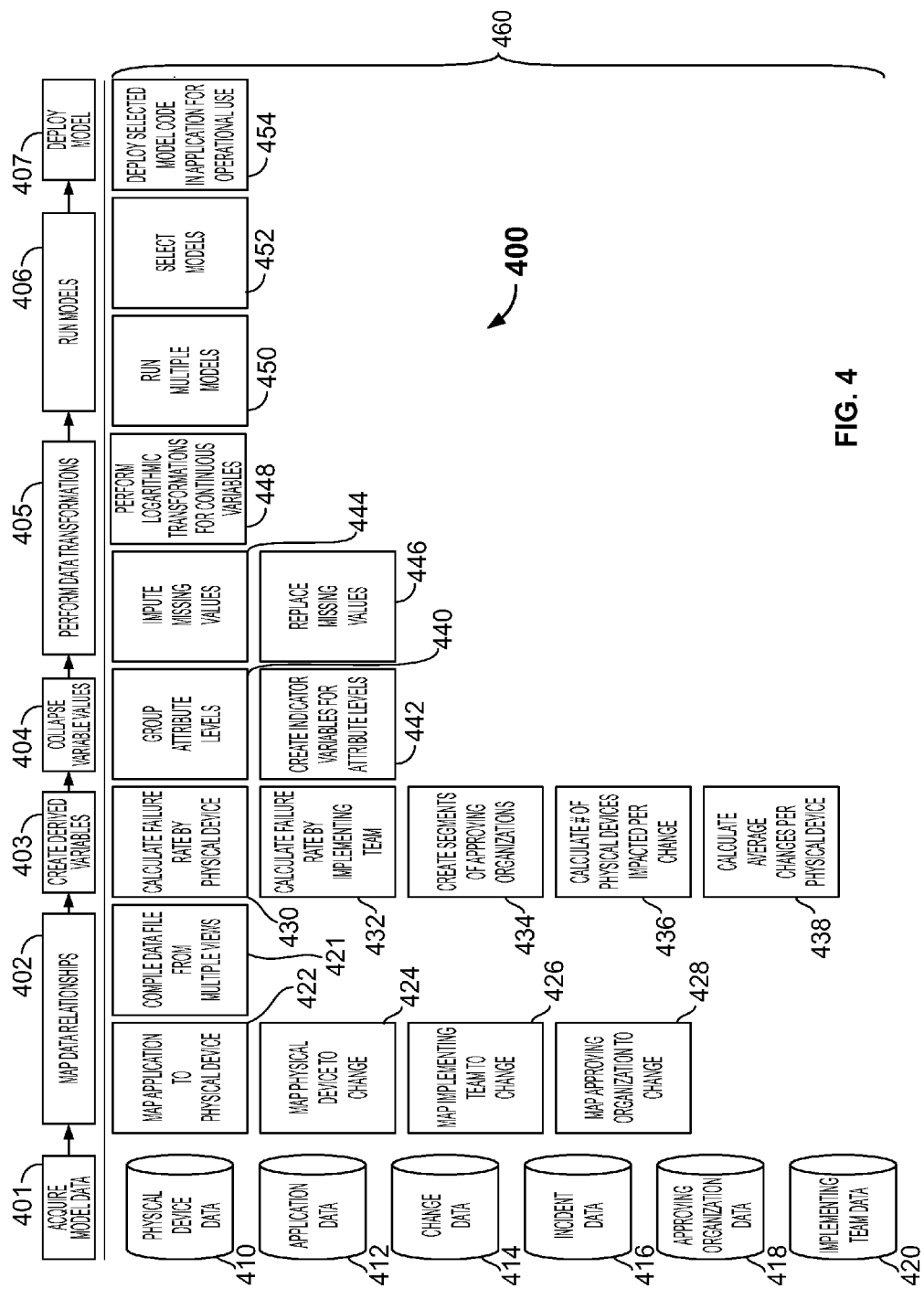
FIG. 4 shows an illustrative process in accordance with the principles of the invention.

FIG. 4 shows illustrative process 400 for developing an infrastructure change risk model. The steps of process 400 may include or involve resources and procedures 460.

At step 401, the system may acquire data from various sources of record ("SOM"). The data may be compiled in a central database. Representative data sources include physical device data 410, application data 412, change data 414, incident data 416, approving organization data 418 and implementing team data 420.

Table 1 shows illustrative information from the SOR.

TABLE 1

Illustrative SOR information.

| SOR | General information type | Illustrative information |
|---|---|---|
| Physical Device Data 410 | Attributes of the physical items that are being configured or affected by the change. | Type of configurable item (server, lpar, midrange, network, etc.) Type of and number of CPUs in configurable item Operating System Who manages or maintains the item |
| Application Data 412 | Information regarding applications supported by or housed on physical devices that are affected by the change. | Peak number of users on each application Average transaction volume of each system Whether the application is internally or externally facing The number of downstream applications dependent on the impacted applications Code inspection & review procedures for the application |
| Change Data 414 | Attributes of the change itself. | Priority Level of process rigor Turn-around time Planned Duration |
| Incident Data 416 | Information on historical incidents caused by the change. | Incident duration Timing Root cause Magnitude |

TABLE 1-continued

Illustrative SOR information.

| SOR | General information type | Illustrative information |
|---|---|---|
| Approving Organization Data 418 | Attributes of organizations or organization segments within an enterprise that approve the change (e.g., an organization that is affected by the change). | Organization Name Rates of successful approvals |
| Implementing Team Data 420 | Attributes of team of individuals that execute the change. | Team name and hierarchy Overall success rates at performing the particular type of change Overall success rates at performing change on particular physical devices |

At step 402, the system may compile a data file from multiple views (421), each containing a different set of related data. The relationships among the data may be mapped. (See, for example, illustrative map 100 (shown in FIG. 1).) For example, a physical device may support many different applications, and many physical devices may be implicated in a single change. Illustrative mappings include mapping applications to physical devices 422, mapping physical devices to changes 424, mapping implementing teams to changes 426, and mapping approving organizations to changes 428. Mapping often creates a "many-to-one" relationship between a change and corresponding change elements.

At step 403, the system may create from the data one or more derived variables. A derived variable may be used to augment the change record or substitute for other information in the change record. The derived variable may be included in the change record as a change element attribute (e.g., mean time between failures for an RF receiver). The derived variable may be included in the change record as a change element (e.g., an organization cluster that is mapped as an approving organization).

A derived variable may be based on performance of a change element over time. A derived variable may aggregate like data based on either functional or statistical similarity to reduce data complexity. A derived variable may be based on two or more data points from the change record or SOR (see step 401).

Representative derived variables include failure rate by physical device 430, failure rate by implementing team 432, segments of approving organizations 434, number of physical devices impacted per change 436 and average changes per physical device 438.

Table 2 shows illustrative derived variables.

TABLE 2

Illustrative derived variables.

| Illustrative derived variable | General description |
|---|---|
| Failure Rate by Physical Device (430) | Temporal frequency of failure of changes that were performed on or affected a physical device |
| Failure Rate by Implementing Team (432) | Temporal frequency of failure of changes performed by an implementing team. |

TABLE 2-continued

Illustrative derived variables.

| Illustrative derived variable | General description |
|---|---|
| Approving Organization segment (434) | A clustering technique, such as a self-organizing map ("SOM") may be used to reduce complexity of approving organization attributes and render a number of organization "segments" having like members. |
| Number of Physical Devices affected by Change (436) | Based on a change map, such as map 100 (shown in FIG. 1) |
| Calculate Average Changes per Physical Device (438) | Average number of changes per defined time period performed on a physical device. |

Whereas the derived variables listed in Table 2 are described in connection with devices and enterprise organizations, the derived variables may be used in the context of any suitable change element, such as an application, or any suitable change factor, such as a combination of change elements or a circumstance, such as geographic location or weather.

Failure rates for a change element may be calculated on the basis of all changes that involve the change element. Failure rates for a change element may be calculated on the basis of one or more types of changes. For example, different failure rates may be derived for different kinds of changes (e.g., upgrade, replacement, new operating system, new class of user, different throughput, etc.).

Approving organizations may have many attributes. The attributes may include, for example, bureaucratic echelon, breadth of authority, affiliation with lines of business, affiliation with more senior management, length of charter, inception of charter, membership size, individual members, individual member tenure, individual member seniority level, individual member experience level, individual member area of expertise, etc. The large number of attributes may be aggregated into a smaller number of clusters, each having members that have like attributes.

At step 404, the system may reduce the number of variable values by selecting from multiple values or collapsing multiple values onto one value or a small number of values. Representative methods include grouping attribute levels 440 and creating indicator variables for attribute levels 442. Many-to-one relationships between changes and corresponding elements may be collapsed into 1:1 or 1:P relationships, where P is a suitable number.

Table 3 shows illustrative multi-valued-variable selection or collapse methods.

TABLE 3

Illustrative multi-valued-variable selection or collapse methods.

| Selection or collapse method | General description |
|---|---|
| Calculation of greatest risk | Of values mapped to a change, the one with the greatest calculated risk is selected for the change. |
| Summation | Values that are mapped to a change are summed to produce a total for the change. |

TABLE 3-continued

Illustrative multi-valued-variable selection or collapse methods.

| Selection or collapse method | General description |
|---|---|
| Indicator variables | Operationally significant levels of a universe-wide variables are identified. The identified levels are defined as binary variables. The presence of such a level in a change record is expressed as a "YES" in the appropriate binary variable. The absence of such a level in the change record is expressed as a "NO" in that binary variable. |
| Consolidation Logic | A flag variable is created to indicate if ANY matched value is present in a change record or if NO matched value is present in a change record. |

At step 405, the system may perform data transformations. A data transformation may be performed to conform change records to a format or scale that improves computational effectiveness. In some regression or neural network models, missing values in change records are not permitted. Representative transformations include imputing missing values 444, replacing missing values 446 and performing logarithmic transformations for continuous variables 448. Logarithmic transformations may reduce the affect of outliers on subsequent modeling steps.

Table 4 shows illustrative data transformation methods.

TABLE 4

Illustrative data transformation methods.

| Data transformation method | General description |
|---|---|
| Impute Missing Values | Missing values may be imputed using standard methods such as individual decision trees, interpolation, averaging, arbitrary constants, as appropriate for each variable. |
| Replace Missing Values | A missing value may be replaced by a user-selected value. |
| Perform Logarithmic Transformations on Continuous Variables | Numerical variables that have a highly skewed distribution may be logarithmically transformed. |

At step 406, the workbench may be used to develop one or more models. The models may be based on any suitable analytical approach. The analytical approaches may include, for example, clustering and self-organizing maps, market basket analysis, sequence and web path analysis, linear and logistic regression, decision trees, gradient boosting, neural networks, least squares regression, multi-stage modeling and other suitable approaches. In some embodiments, the analytical approaches may include dimension reduction techniques such as, e.g., variable selection, LARS (Least Angle Regression) variable selection, principal components, variable clustering, time series analysis and other suitable dimension reduction techniques.

Predictive models may be tested (450) using historical data. The models may be run using the workbench and may be based on regression (stepwise, backward, etc.), neural networks and decision trees or other suitable methods.

In some embodiments, a suite of predictive models may be run against a set of historical changes (representing, for example, approximately 1.5 years of infrastructure change data). A model may then be selected (452) based on any suitable subjective or objective criterion or criteria. For example, the criterion or criteria may be based on validation statistics such as lift, average squared error, or other suitable statistics.

At step 407, a selected model may be deployed to predict failure of a prospective infrastructure change. The model can be deployed with code 454 that receives as input a prospective change record. The code may include instructions for executing steps such as 401 through 405.

In some embodiments, the selected model may be executed on a periodic basis, or from time to time, on prospective infrastructure change records. The system may add to each prospective change record a likelihood or probability of failure. Multiple prospective changes may be stacked ranked based on likelihood or probability of failure from highest to lowest risk. The highest risk changes are sent to an operations team that actively engages the appropriate implementation team or teams to address the risks identified.

Figure 5:
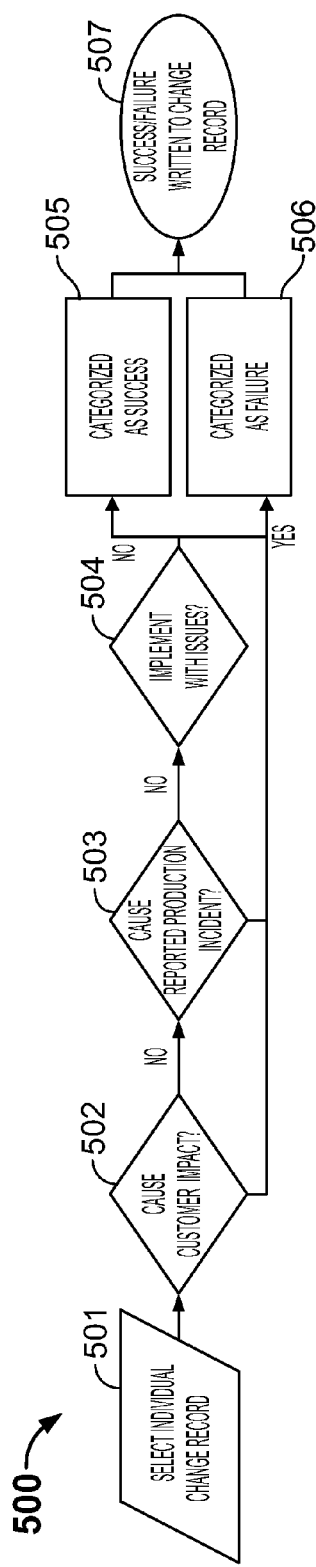
FIG. 5 shows another illustrative process in accordance with the principles of the invention.

FIG. 5 shows illustrative process 500 for evaluating a historical outcome field such as historical outcome field 214 (shown in FIG. 2) in a change record.

At step 501, the system selects an individual change record from the universe of enterprise change records. At step 502, the system (or a system user or other individual) determines whether the infrastructure change corresponding to the change record caused a customer incident. In some embodiments, the customer incident may be an event that resulted in a problem, inconvenience, or service level deficiency for an enterprise customer. If at step 502, the infrastructure change is determined to have caused a customer incident, process 500 continues at step 506. At step 506, the system categorizes the infrastructure change as a failure (as it did, hypothetically, for the change in FIG. 2). Process 500 then continues at step 507. At step 507, the system writes the failure categorization from step 506 to the change record.

If at step 502, the infrastructure change was determined not to have caused a customer incident, process 500 continues at step 503. At step 503, it is determined whether the infrastructure change resulted in a reported production incident. In some embodiments, a production incident may be an identified malfunction that did not cause a customer incident. If at step 503 it is determined that a production incident occurred, process 500 continues at step 506 and proceeds as discussed above.

If at step 503 it is determined that a production incident did not occur, process 500 continues at step 504. At step 504, it is determined whether the infrastructure change was implemented with issues. In some embodiments, an infrastructure change that was implemented with issues is an infrastructure change that was deployed despite a known issue that did not yet lead to customer incident or a production incident. If at step 504 it is determined that the infrastructure change was implemented with issues, process 500 continues at step 506 and proceeds as discussed above.

If at step 504, it is determined that the infrastructure change was not implemented with issues, process 500 continues at step 505. At step 505, the infrastructure change is categorized as a success. At step 507, the system writes the success categorization from step 506 to the change record.

Figure 6:
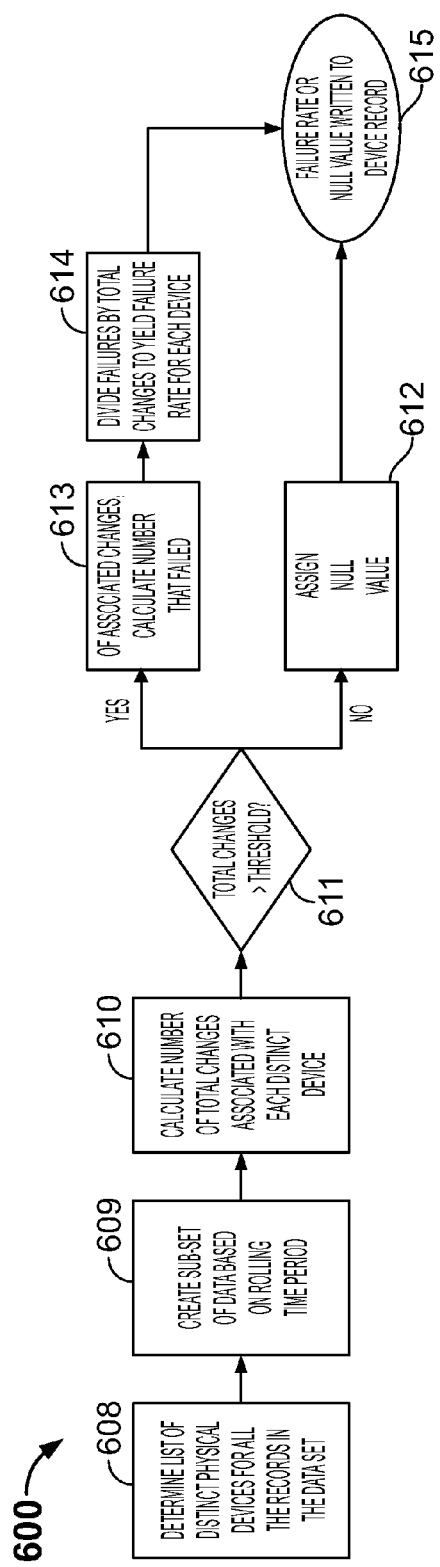
FIG. 6 shows still another illustrative process in accordance with the principles of the invention.

FIG. 6 shows illustrative process 600 for determining a failure rate for a change element such as a physical device. Process 600 may correspond to procedure 430 of process 400 (shown in FIG. 4). At step 608, the system may create a list of distinct physical devices associated with the change records in the enterprise universe. The list may include a device record for each distinct device. The device record may include infrastructure change information for infrastructure changes that are operationally associated with the devices. The infrastructure change information may include infrastructure change dates.

At step 609, the system may partition the list into time periods so that infrastructure changes during a distinct time period can be analyzed for each device. At step 610, the system calculates a total number of changes that are associated with each distinct device. At step 611, the system determines whether the total number of changes exceeds a selected threshold.

If at step 611 the total number of changes does not exceed the selected threshold, process 600 continues at step 612. At step 612, the system assigns a null value to the device record. At step 615, the system writes the null value to the device record.

If at step 611 the total number changes exceeds the selected threshold, process 600 continues at step 613. At step 613, the system calculates the number of the total changes that are failed changes. At step 614, the system divides the number of failed changes by the number of total changes for the device to arrive at a failure rate. The system may calculate failure rates for each device for different time periods using the time-partition described in connection with step 609. At step 615, the system writes the failure rate or rates, if time-partitioned, to the device record.

Figure 7:
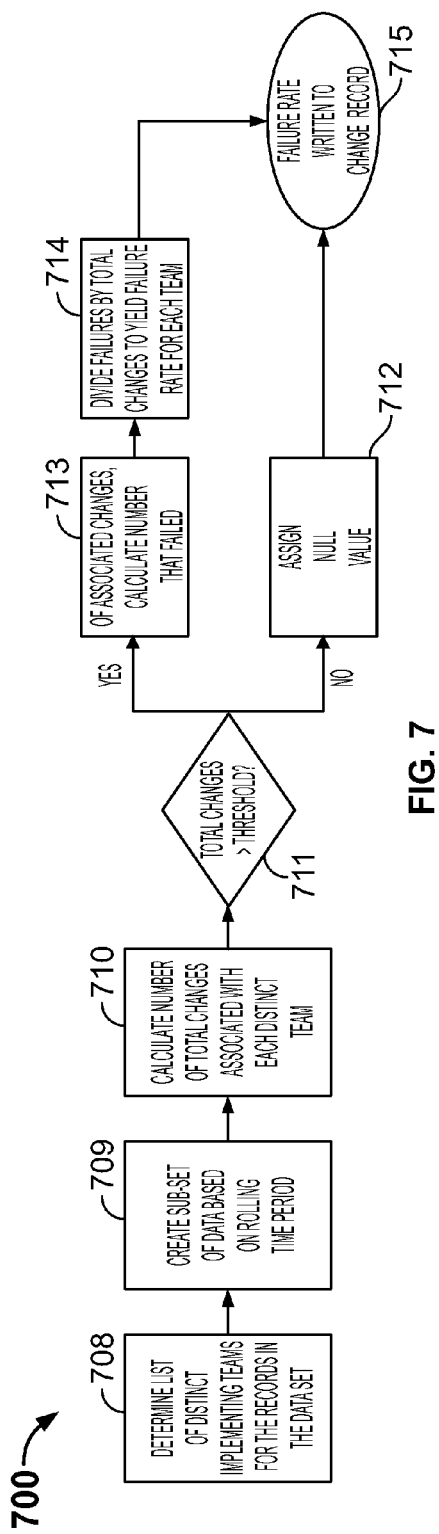
FIG. 7 shows yet another illustrative process in accordance with the principles of the invention.

FIG. 7 shows illustrative process 700 for determining a failure rate for a change element such as a physical implementing team. Process 700 may correspond to procedure 432 of process 400 (shown in FIG. 4). At step 708, the system may create a list of distinct implementing teams associated with the change records in the enterprise universe. The list may include an implementing team record for each distinct implementing team. The implementing team record may include infrastructure change information for infrastructure changes that are operationally associated with the implementing teams. The infrastructure change information may include infrastructure change dates.

At step 709, the system may partition the list into time periods so that infrastructure changes during a distinct time period can be analyzed for each implementing team. At step 710, the system calculates a total number of changes that are associated with each distinct implementing team. At step 711, the system determines whether the total number of changes exceeds a selected threshold.

If at step 711 the total number of changes does not exceed the selected threshold, process 700 continues at step 712. At step 712, the system assigns a null value to the implementing team record. At step 715, the system writes the null value to the implementing team record.

If at step 711 the total number changes exceeds the selected threshold, process 700 continues at step 713. At step 713, the system calculates the number of the total changes that are failed changes. At step 714, the system divides the number of failed changes by the number of total changes for the implementing team to arrive at a failure rate. The system may calculate failure rates for each implementing team for different time periods using the time-partition described in connection with step 709. At step 715, the system writes the failure rate or rates, if time-partitioned, to the implementing team record.

Figure 8:
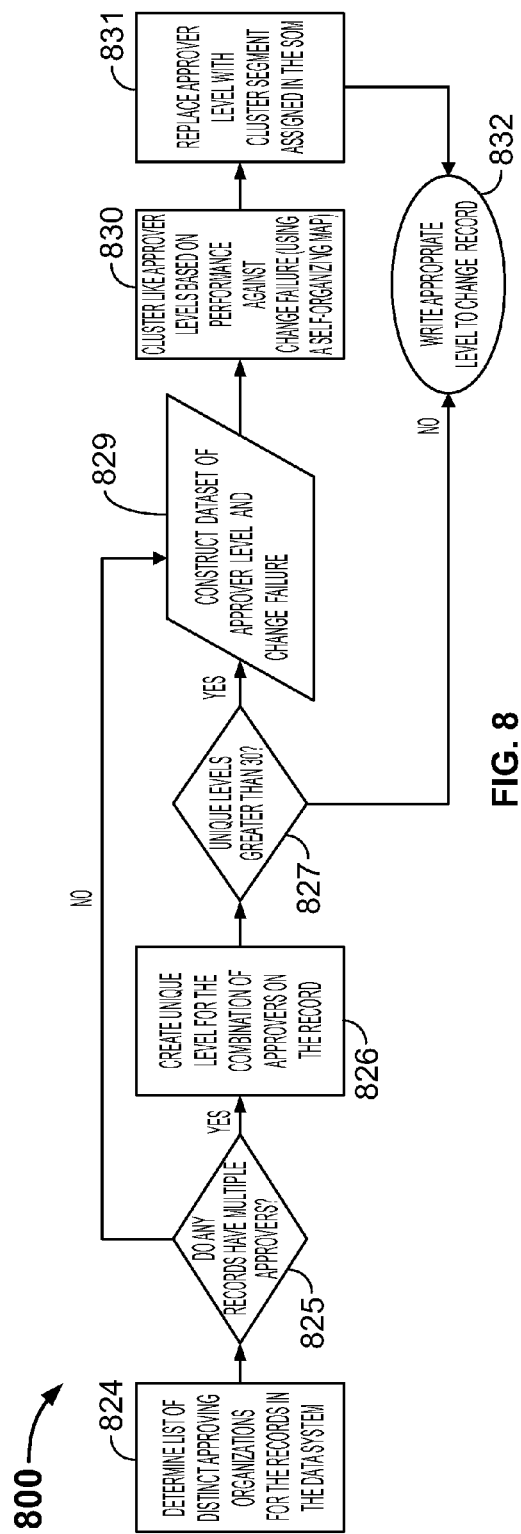
FIG. 8 shows yet another illustrative process in accordance with the principles of the invention.

FIG. 8 shows illustrative process 800 for identifying segments of approving organizations and associating the segments with success/failure scores for inclusion in a change record. Process 800 may correspond to procedure 434 of process 400 (shown in FIG. 4). At step 824, the system may compile a list of distinct approving organizations for the change records in the enterprise change record universe. At step 825, the system may identify change records corresponding to infrastructure changes that are operationally associated with multiple approving organizations. For example, when the enterprise is a financial institution, an e-commerce team and a bank card team may both have approving responsibility for an infrastructure change related to authentication of on-line credit card transactions.

At step 826, the system may create a unique level for each of any combinations of multiple approvers in the change records. For example, the system will add the level, "E-COMMERCE TEAM+BANK CARD TEAM" to the list of distinct approving organizations. At step 827, the number of unique levels are analyzed to see if they exceed a threshold number such as 30.

If at step 827 the number of unique levels not greater than 30, process 800 continues at step 832. At step 832, the system includes the actual approving organization or combination of organizations in the change record. Each approving organization or combination of approving organizations may have a historical success/failure score based on historical performance. The historical success/failure score may be included in the change record for predictive modeling.

If at step 827, the number of unique levels is greater than 30, process 800 continues at step 829. At step 829, the system may construct a dataset of approving organization levels (each level including an approving organization or combination of approving organizations) and corresponding success/failure scores based on historical performance. At step 830, the system may cluster the approving organization levels based on any suitable approving organization attribute or attributes. For example, the system may cluster the levels based on number of changes assigned to the level (i.e., approving organization or combination of approving organizations), frequency of assignment of changes, change lifetime metrics (mean length of time between change process inception and final approval, maximum length of time between change process inception and final approval, minimum length of time between change process inception and final approval, e.g.), presence of extenuating circumstances and any other suitable attributes. The system may use success/failure scores of the levels as a clustering dimension. Thus, each cluster may have a cluster-based effective success/failure score. The system may constrain the total number of clusters to be less than the total number of unique approving organization levels. The system may assign to each change record the approving organization level cluster that most closely matches the actual approving organization level of the change record. The system may use a self-organizing map to perform the assignment.

At step 831, the system replaces the actual approving organization levels with corresponding cluster-based approving organization levels. At step 832, cluster-based approving organization levels, along with corresponding effective success/failure scores, are written into the change records.

Figure 9:
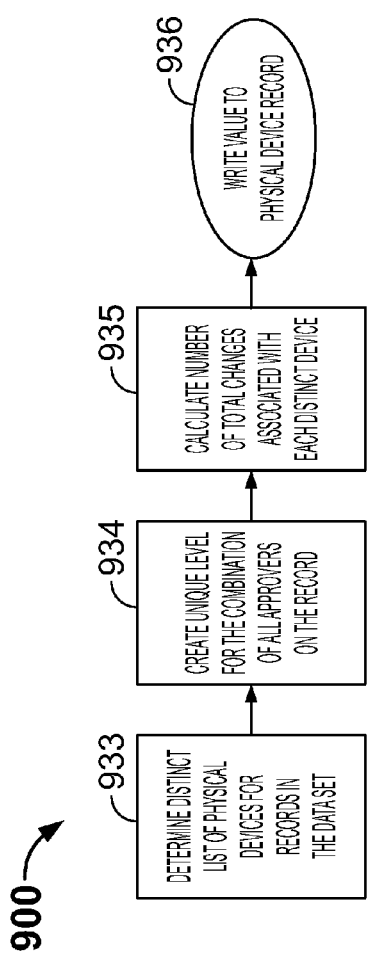
FIG. 9 shows yet another illustrative process in accordance with the principles of the invention.

FIG. 9 shows illustrative process 900 for calculating an average number of changes for a change element such as a physical device. Process 900 may correspond to procedure 438 of process 400 (shown in FIG. 4). At step 933, a list of distinct physical devices for all change records in the data set is determined. At step 934, a subset of data is created based on a rolling time period. At step 935, the total number of changes associated with each distinct device is calculated. At step 936, this data is recorded in the device record.

Figure 10:
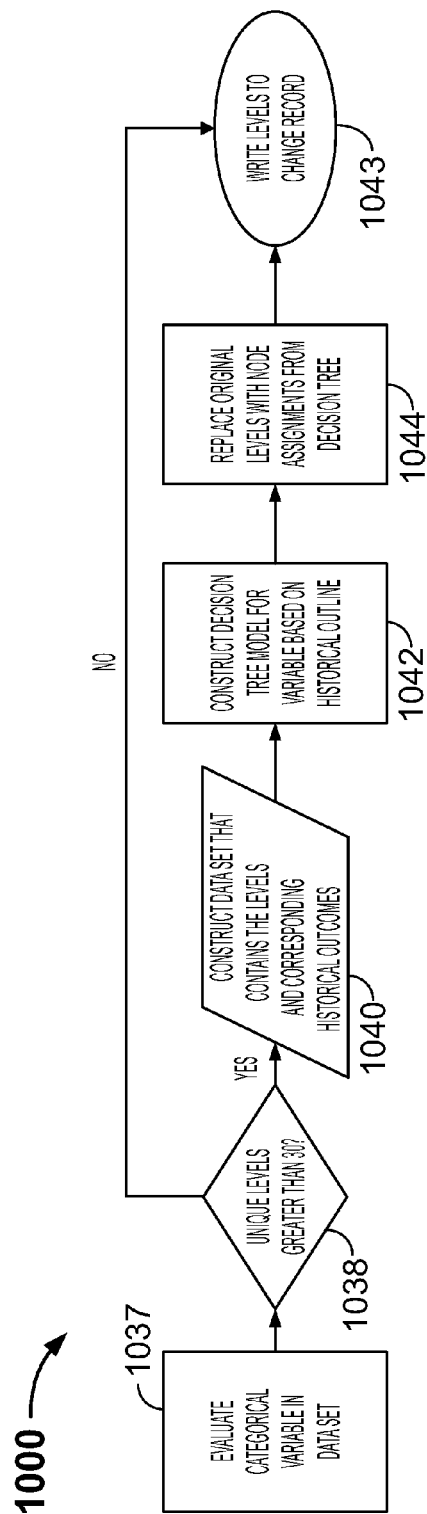
FIG. 10 shows yet another illustrative process in accordance with the principles of the invention.

FIG. 10 shows illustrative process 1000 for grouping levels to consolidate independent variables. Process 1000 may correspond to procedure 440 of process 400 (shown in FIG. 4). At step 1037, the system identifies a categorical variable in the enterprise change record universe. For example, the categorical variable may be the identity of an enterprise facility that houses a change element. At step 1038, the system determines whether the categorical variable has greater than a threshold number, such as 30, of levels. For example, when an enterprise has numerous corporate offices, customer service locations and data processing centers, the enterprise may have more than 30 enterprise facilities.

If at step 1038 the system determines that the number of distinct levels (enterprise facilities, in the example) is not greater than 30, process 1000 may continue at step 1043. At step 1043, the system may write the actual levels to the corresponding change records.

If at step 1038 the system determines that the number of distinct levels is greater than 30, process 1000 continues at step 1040. At step 1040, a data set is constructed that contains the unique levels and corresponding historical outcomes, such as value 214 in change record 200 (shown in FIG. 2).

At step 1044, the system may construct a decision tree model for the categorical variable. The decision tree model may be constrained by the historical outcomes. At step 1042, the system may identify nodes in the decision tree and map each of the categorical variable levels (e.g., enterprise facility) to a decision tree node. The system may select a section of the decision tree that includes a number of nodes that is smaller than the number of categorical variable levels. At step 1044, the system may replace each of the original categorical variable levels with a decision tree node. Each node has a corresponding effective historical success/failure score. Thus, the system may effectively reduce the number of levels in the categorical variable. At step 1043, the node-assignment levels, along with corresponding effective historical success/failure scores are written into the change records.

FIG. 11 shows illustrative process 1100 for creating indicator variables from a categorical variable. Process 1100 may correspond to procedure 442 of process 400 (shown in FIG. 4). At step 1144, the system may identify a categorical variable that has values that are included in the change records of the enterprise change record universe. For example, the categorical variable may be the identity of a component vendor. In some embodiments, a non-categorical variable may be cast as a categorical variable for processing in process 1100. For example, a continuous variable may be expressed in "bins." The bins then may be treated as categories. At step 1145, the system may determine whether the categorical variable has more than one value per change. If at step 1145, the system determines that the categorical variable does not have more than one value per change, process 1100 may continue at step 1146. At step 1146, the categorical variable may be used in the change records without transformation.

If at step 1145 the system determines that the categorical variable does have more than one value per change, process 1100 may continue at step 1147. At step 1147, the system may determine whether more than one of the multiple values is pertinent to failure prediction. If at step 1147 the system determines that not more than one of the values is pertinent to failure prediction, process 1100 may continue at step 1146 and proceed as described above.

If at step 1147 the system determines that more than one of the values is pertinent to failure prediction, process 1100 may continue at step 1148. At step 1148, the system may select values of the categorical variable (component vendor, e.g.) that occur in the change records with significant frequency. At step 1149, the system may create individual binary variables corresponding to the frequent values. For example, "Acme Components, Inc." may occur frequently in the change records. The system would thus create the binary variable "ACME COMPONENTS." At step 1150, the system may record for each change record a binary value for each of the binary variables. For example, in change record 345987, the binary variable ACME COMPONENTS would be TRUE if a change element in change record 345987 was associated with the vendor Acme Components, Inc. At step 1160 the system may write the binary variables and values to the change records.

FIG. 12 shows illustrative process 1200 for the modification of derived variables based on date and time attributes for the change. Steps 1261 through 1264 show the modification of derived variables based on date and time attributes for the change. At step 1261, data related to planned start time, planned end time and completion time for each change is retrieved. At step 1262, the planned duration of the change is calculated by subtracting the planned end data from the planned start data. At step 1263, new variables are created to indicate the hour of day, day of week, and/or month of year of each change. At step 1264, the new variables are written into the change record.

Figure 13:
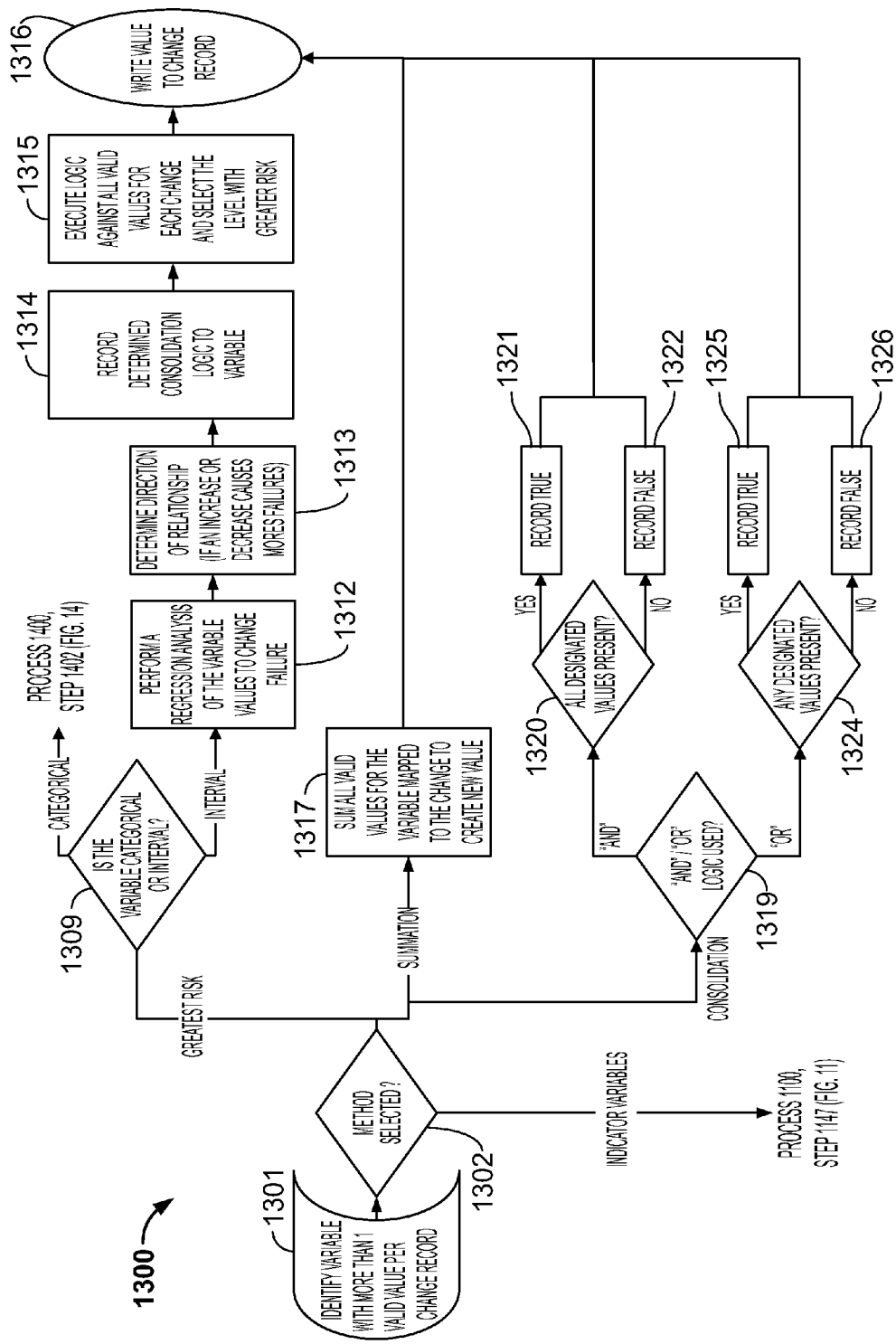
FIG. 13 shows yet another illustrative process in accordance with the principles of the invention.

FIG. 13 shows illustrative process 1300 for collapsing multi-valued variables into variables having a reduced number of values. Process 1300 may correspond to procedure step 404 of process 400 (shown in FIG. 4).

At step 1301, the system may identify a variable that has, in at least one change record in the enterprise universe, more than one valid value. At step 1302, the system or a user may select consolidation method.

If at step 1302 it is decided that indicator variables are to be created, process 1300 may bridge to process 1100, step 1147 (shown in FIG. 11 and described above).

If at step 1302, the "greatest risk" approach is selected, process 1300 may continue at step 1309. At step 1309, the system may determine whether the variable to be collapsed is a categorical variable or an interval variable. Categorical variables have discrete values, while interval variables have continuous values.

Figure 14:
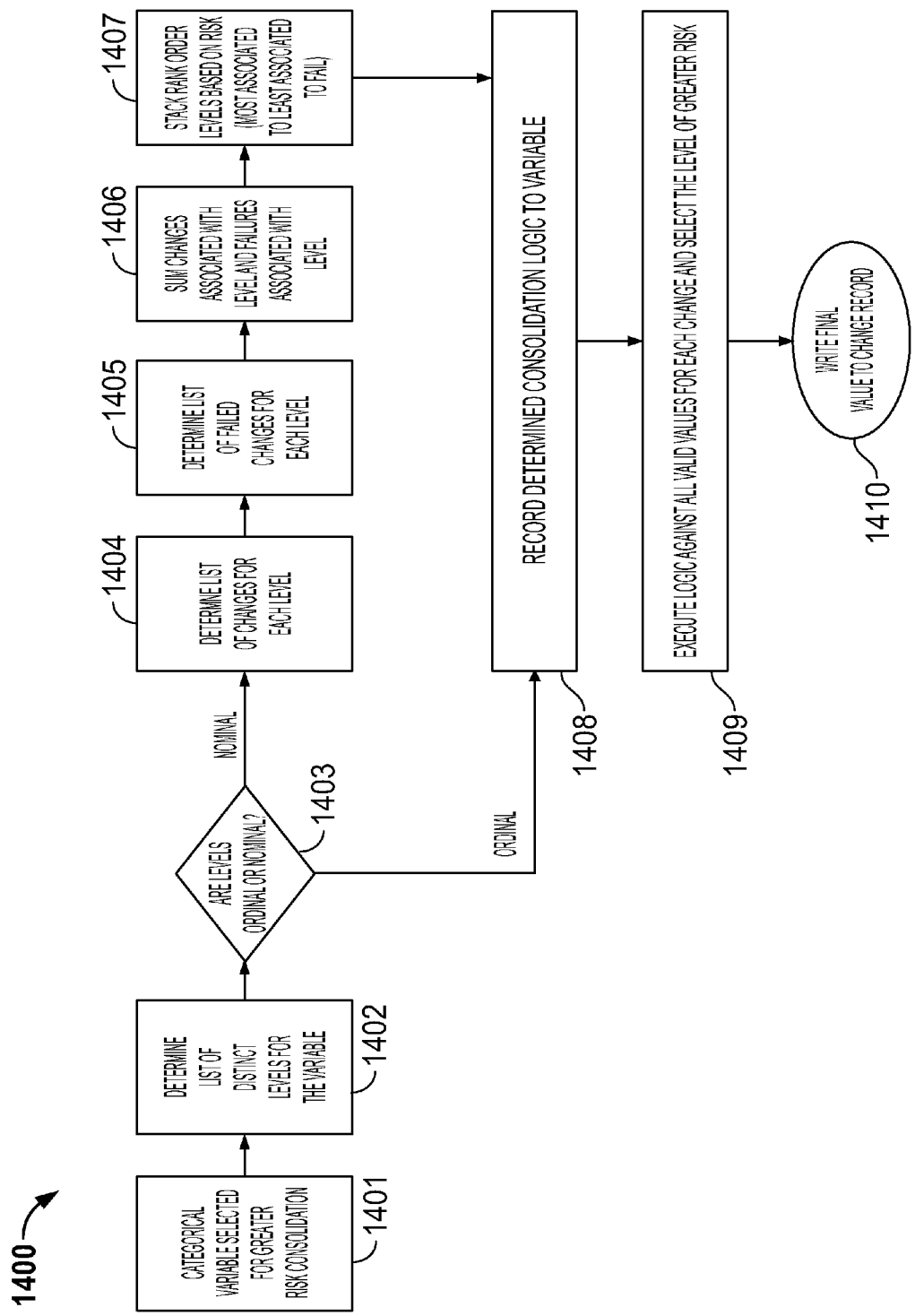
FIG. 14 shows yet another illustrative process in accordance with the principles of the invention.

If at step 1309 the system determines that the variable is a categorical variable, process 1300 may continue bridge to process 1400, step 1402 (shown in FIG. 14).

If at step 1309 the system determines that the variable is an interval variable, process 1300 may continue at step 1312. At step 1312, the system may regress the variable against corresponding success/failure scores over all the change records in the enterprise change record universe to calculate a correlation relationship. At step 1313, the system may determine whether the correlation relationship is positive (increasing value for increasing failure risk, e.g.) or negative (decreasing value for increasing failure risk, e.g.).

At step 1314, the system may associate the correlation relationship with the variable. At step 1315, the system may apply the correlation relationship to values of the variable in each change record to produce a corresponding effective failure risk score for each of the values. The system may then select the greatest of the effective failure risk scores. At step 1316, the system may, in each record having multiple values of the variable, replace the multiple values with the greatest value.

If at step 1302, the "summation" approach is selected, process 1300 may continue at step 1317. At step 1317, the system may sum all valid values for the variable that are mapped to the change. The sum then becomes a new variable. For example, when the variable is "number of error messages generated per month," the system may sum the number of error messages generated per month for all devices that map to a change. The system then designates the sum as a variable for the change record for the change. The system may process corresponding values of "number of error messages generated per month" in the other change records in the enterprise universe in the same manner. At step 1318, the system may write the sum into the change record.

If at step 1302, the "consolidation" approach is selected, process 1300 may continue at step 1319. At step 1319, the system or a user may designate one or more critical values to be compared to values in change records. For example, individual change records in the enterprise change record universe may include numerous hard disc models and numerous hard disc driver versions that map to the change represented by the change record. The system may designate hard disc model XYZ-1234 and driver version 100.3 as critical values, based on known incompatibilities with each other, for example.

At step 1320, the system may apply "AND" logic to the critical values with respect to each change record in the enterprise change record universe. At step 1321, when both the hard disc and driver are present in the change record, the system may set a Boolean variable to "TRUE." At step 1322, when the change record does not include both the hard disc and the driver, the system may set the Boolean variable to "FALSE." At step 1316, the system may write the Boolean variable and its value to the change record.

At step 1319, the system may designate one of the hard disc model and the driver version as critical values, for example, based on knowledge that the disc model and the driver version are prone to fail independently of each other. At step 1322, the system may apply "OR" logic to the critical values with respect to each change record in the enterprise change record universe. At step 1325, when either the hard disc or the driver are present in the change record, the system may set a Boolean variable to "TRUE." At step 1326, when the change record does not include either of the hard disc and the driver, the system may set the Boolean variable to "FALSE." At step 1316, the system may write the Boolean variable and its value to the change record.

FIG. 14 shows illustrative process 1400 for collapsing multiple values of categorical variables. The system may rank the values in order of failure risk, so that the value with the greatest risk may be selected.

At step 1401, the system may select a categorical variable for greatest risk consolidation. At step 1402, the system may generate a list of the distinct levels for the variable that occur in the enterprise change record universe. At step 1403, the system may determine whether the values are nominal or ordinal.

Ordinal levels are relative to each other and may be categorized based on failure risk by a simple relationship that indicates whether failure risk increases or decreases with order. If at step 1403 the system determines that the values are ordinal, process 1400 may continue at step 1408. At step 1408, the system may associate the relationship between order and failure risk with the variable. At step 1409, the system may apply the relationship to the ordinal values in each change record. The system may then select the level with the greatest failure risk. At step 1410, the system may write the value having the greatest risk, along with the failure risk, to the change record.

If at step 1403 the system determines that the values are nominal, process 1400 may continue at step 1404. At step 1404, the system may identify all of the failed changes in the enterprise change record universe that correspond to each nominal level. At step 1406, the system may sum all of the changes in the enterprise change record universe that correspond to each of the nominal levels. At step 1407, the system may rank the nominal levels based on the ratio of failed changes to total changes for each level. At step 1408, the ranking may be associated with the nominal variable. At step 1409, the ranking may be applied to each individual change record. Process 1400 may continue at step 1410, which is described above.

Thus, apparatus and methods for reducing infrastructure failure rates are therefore provided. Persons skilled in the art will appreciate that the present invention can be practiced by other than the described embodiments, which are presented for purposes of illustration rather than of limitation, and that the present invention is limited only by the claims that follow.

What is claimed is:

1. Apparatus for reducing infrastructure failure rates, the apparatus comprising:
    machine memory storing a first array of infrastructure change element attributes and a second array of change element tallies, each tally corresponding to one of the change element attributes and corresponding to a number of change elements having a respective attribute, the first and second arrays being based on a plurality of historical change records; and
    a processor that is configured to:
        select one or more of the change element attributes based on the corresponding tallies;
        select one of the plurality of historical change records; and
        enter into the selected one of the historical change records a Boolean variable corresponding to each of the one or more selected change element attributes.

2. The apparatus of claim 1 wherein, in the first array of change element attributes, the attributes include device attributes.

3. The apparatus of claim 2 wherein the device attributes include device model.

4. The apparatus of claim 1 wherein, in the first array of change element attributes, the attributes include program attributes.

5. The apparatus of claim 4 wherein the program attributes include program version.

6. The apparatus of claim 1 wherein, in the first array of change element attributes, the attributes include organization segment attributes.

7. The apparatus of claim 6 wherein the organization segment attributes include segment membership number.

8. A method for reducing infrastructure failure rates, the method comprising:
    storing in machine memory a first array of infrastructure change element attributes and a second array of change element tallies, each tally corresponding to one of the change element attributes and corresponding to a number of change elements having a respective attribute, the first and second arrays being based on a plurality of historical change records; and
    using a processor to:
        select one or more of the change element attributes based on the corresponding tallies;
        select one of the plurality of historical change records; and
        enter into the selected one of the historical change records a Boolean variable corresponding to each of the one or more selected change element attributes.

9. The method of claim 8 wherein, in the first array of change element attributes, the attributes include device attributes.

10. The method of claim 9 wherein the device attributes include device model.

11. The method of claim 8 wherein, in the first array of change element attributes, the attributes include program attributes.

12. The method of claim 11 wherein the program attributes include program version.

13. The method of claim 8 wherein, in the first array of change element attributes, the attributes include organization segment attributes.

14. The method of claim 13 wherein the organization segment attributes include segment membership number.

* * * * *